(12) United States Patent
Di Silvestro et al.

(10) Patent No.: US 9,822,308 B2
(45) Date of Patent: Nov. 21, 2017

(54) STAR- AND TREE-SHAPED BRANCHED POLYMERS HAVING FLAME-RETARDANT PROPERTIES

(75) Inventors: Giuseppe Di Silvestro, Lentate sul Seveso (IT); Yuan Cuiming, Milan (IT); Marco Ortenzi, Milan (IT); Hermes Farina, Sorisole (IT); Tommaso Lugato, Villasanta (IT); Luca Basilissi, Cornaredo (IT)

(73) Assignee: UNIVERSITA' DEGLI STUDI DI MILANO, Milan (IT)

( * ) Notice: Subject to any disclaimer, the term of this patent is extended or adjusted under 35 U.S.C. 154(b) by 86 days.

(21) Appl. No.: 13/993,813

(22) PCT Filed: Dec. 14, 2011

(86) PCT No.: PCT/EP2011/072706
§ 371 (c)(1),
(2), (4) Date: Jun. 25, 2013

(87) PCT Pub. No.: WO2012/080304
PCT Pub. Date: Jun. 21, 2012

(65) Prior Publication Data
US 2013/0281654 A1 Oct. 24, 2013

(30) Foreign Application Priority Data

Dec. 15, 2010 (IT) .......................... MI2010A002305

(51) Int. Cl.
| | |
|---|---|
| *C08G 69/42* | (2006.01) |
| *C09K 21/14* | (2006.01) |
| *C08G 63/692* | (2006.01) |
| *C08K 5/5313* | (2006.01) |
| *C08L 77/06* | (2006.01) |
| *C08L 85/02* | (2006.01) |

(52) U.S. Cl.
CPC ............ *C09K 21/14* (2013.01); *C08G 63/692* (2013.01); *C08G 63/6922* (2013.01); *C08G 63/6926* (2013.01); *C08G 69/42* (2013.01); *C08K 5/5313* (2013.01); *C08L 77/06* (2013.01); *C08L 85/02* (2013.01); *C08L 2201/02* (2013.01)

(58) Field of Classification Search
CPC ...... C08L 77/06; C08L 85/02; C08L 2201/02; C08K 5/5313; C08G 69/42; C08G 63/692; C08G 63/6926
See application file for complete search history.

(56) References Cited

U.S. PATENT DOCUMENTS

| | | | | |
|---|---|---|---|---|
| 4,387,184 | A | * | 6/1983 | Coquard et al. .............. 525/183 |
| 5,750,603 | A | * | 5/1998 | Asrar ..................... C08G 69/42 |
| | | | | 524/139 |
| 6,037,421 | A | * | 3/2000 | Asrar ............................ 525/420 |

FOREIGN PATENT DOCUMENTS

WO 2005/005512 1/2005

OTHER PUBLICATIONS

Lin Song, et al., Method for Producing Fireproofing . . . , 2009, XP002655687.
Wang, Yanlin et al., P—N Synergistic Fire-Retarding Compound . . . , 2010, XP002671958.

* cited by examiner

*Primary Examiner* — Gregory Listvoyb
(74) *Attorney, Agent, or Firm* — Silvia Salvadori, P.C.; Silvia Salvadori

(57) ABSTRACT

Disclosed are polymers with a complex branched structure (star- or tree-shaped) obtainable by polymerizing a bifunctional type AB monomer and/or type AA+BB monomers in the presence of: a) one or more polyamine and/or a polyacid and/or a polyalcohol and/or more generally a compound (such as POSS) having at least three functional groups such as amino, carboxylic acid or hydroxyl functions; b) one or more phosphorus containing molecules reacting with only one reactive group during the polymerization; c) optionally one or more organic acid and/or an amine and/or an alcohol having one or two functional groups.

8 Claims, 5 Drawing Sheets

STAR- AND TREE-SHAPED BRANCHED POLYMERS HAVING FLAME-RETARDANT PROPERTIES

The present invention relates to polymers with a complex branched structure, in particular the star- or tree-shaped type, characterized by having phosphorous containing molecules giving flame-retardant property.

PRIOR ART

The flame retardance of polymer materials, in particular polyamides, is currently obtained by a process of physical mixing (compounding) of the molten polymer matrix with materials having proven flame-resistant properties (additives). The main drawbacks of said process are the difficulty of distributing the additive evenly in the matrix, phase segregations, and possible migration and loss of additive over time. The direct consequences of these drawbacks are the need for massive use of additives, increased costs of the material, and often a deterioration in its mechanical properties and loss of properties over time. Moreover, the classes of additives currently used present a number of problems: for example, brominated compounds are added in large quantities (up to 23-25% w/w) and need a synergistic agent (usually antimony trioxide) in the quantity of approx. 6-8% w/w; many of these compounds are known to be toxic to humans and the environment, and are consequently governed by national and supranational regulations restricting their manufacture and use. Red phosphorus (added in the quantity of 5-10% by weight) presents handling problems (fire risk) and is not suitable for many applications, while metal hydroxides have low efficiency and are used in large quantities (up to 50% by weight), resulting in loss of the properties of the final material and are not commonly used with polyamides and polyesters. Finally, melamine cyanurate makes it impossible to recycle the material, and precludes some applications. In all cases, the material produced cannot be used in the manufacture of textile fibers due to its incompatibility with spinning techniques. These problems are discussed, for example, in "Combustion and fire retardancy of aliphatic nylons"—S. V. Levchik, E. D. Weil, Polym. Int. 49:1033-1073 (2000).

WO 98/52991 describes type 6,6 polyamides with flame-retardant properties obtained by polycondensation of at least one dicarboxylic acid, at least one diamine and a carboxyphosphinic acid.

Polyamides 6 with a complex star- or tree-branched structure, obtainable from AB monomers (i.e. monomers having a carboxy function A and an amino function B) in the presence of polyamines and/or polyacids, are also known from U.S. Pat. No. 6,884,865.

The preparation of branched polymers with a complex structure is discussed in detail in "Hyperbranched and Highly Branched Polymer Architectures: Synthetic Strategies and Major Characterization Aspects". B. I. Voit and A. Lederer *Chem. Rev.* 2009, 109, 5924-5973.

DESCRIPTION OF THE INVENTION

Figure 1:
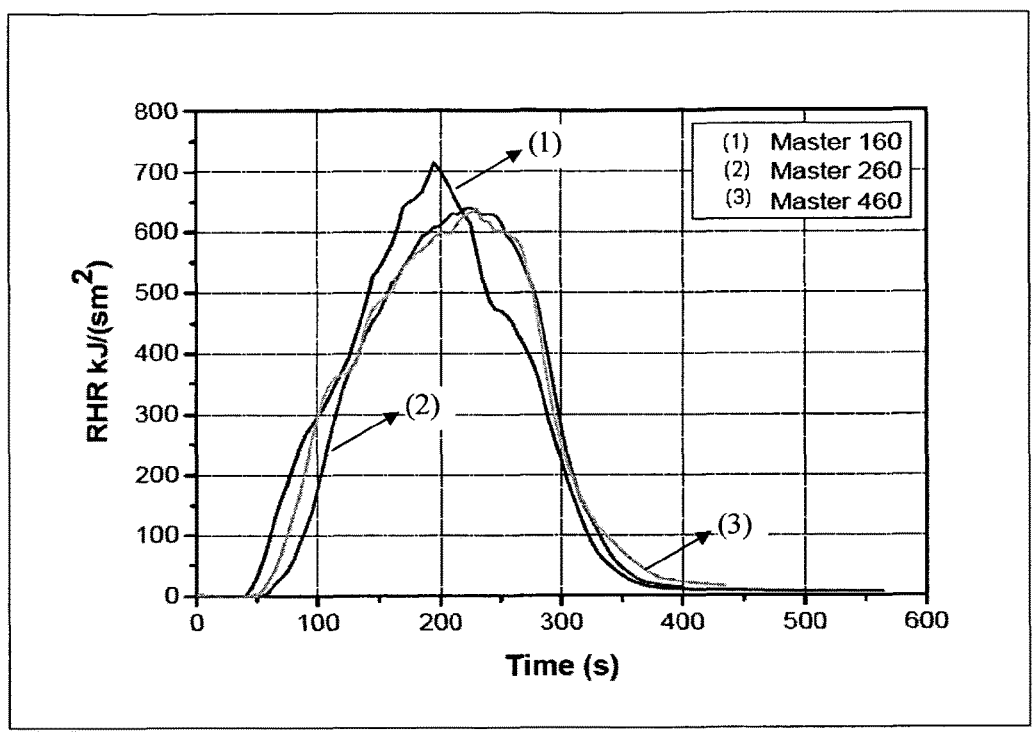
FIG. 1 shows the cone calorimeter analysis of the samples with diacid phosphorus.

It has now been found that it is possible to impart advantageous flame-retardant properties to polymers with a complex (star- or tree-) branched structure, which are obtainable from AB bifunctional monomer and/or type AA+BB monomers and using phosphorous containing molecules as chain enders. The polymers according to the invention, such as polyamides and polyesters, present advantageous properties because the complex macromolecular architecture (star/tree type) makes it possible to vary the number of terminal functional groups, and consequently the number of phosphorous containing groups which can be introduced to modulate the flame-retardant property, as well as the viscosity of the polymer and other parameters useful for the manufacturing process.

The invention therefore provides polymers with a complex branched structure (star- or tree-shaped) obtainable by polymerization of a bifunctional type AB monomer and/or type AA+BB monomers in the presence of:

a) One or more polyamines and/or polyacids and/or polyalcohols and/or more generally compounds (such as Polyhedral Oligosilsequioxanes—POSS) having at least three functional groups such as primary or secondary amino functions, carboxylic acid (or their derivatives such as esters and anhydride) or hydroxyl functions;

b) one or more phosphorus containing molecules reacting with only one reactive group during the polymerization;

c) optionally one or more carboxylic acids (or their derivatives such as ester and anhydride) and/or amines and/or alcohols having one or two functional groups.

DETAILED DESCRIPTION OF THE INVENTION

According to the invention, AB and/or AA+BB monomers with A=—COOH (or his derivative such as ester and anhydride) and B=—NH$_2$ or —OH can be used.

A preferred family of polymers is the family of polyamides, which have specific, advantageous applications, especially in the textile field, in the preparation of carpets, clothing and furnishings which possess the desired flame-retardant properties.

Examples of AB monomers which can be used to prepare polyamides or polyesters according to the invention include caprolactam, 6-aminohexanoic acid, para- or meta-aminobenzoic acid, 11-aminoundecanoic acid, lauryl lactam, 12-aminododecanoic acid, caprolactone, lactic acid and lactide; preferably caprolactam, 6-aminohexanoic acid, caprolactone and lactide.

Examples of AA+BB monomers which can be used to prepare polyamides or polyesters according to the invention include: 1) as BB monomer for polyamides preparation, diamine molecules like hexamethylenediamine, isophorondiamine, phenylendiamines; as. BB monomer for polyester preparation, diols molecules like ethylene glycol, polyethyleneglicols (PEG), propanediols, polypropyleneglycols (PPG), 1,4-butanediol, polybutyleneglycols, 1,6 hexanediol, cyclohexane diols, dimethylolcyclohexane isomers.

2) As AA diacids monomers for polyamides or polyesters preparation, aliphatic or aromatic dicarboxylic acids (or their derivatives such as esters and anhydride) like adipic acid, suberic acid, sebacic acid, cyclohexane dicarboxylic acid, phthalic acids, naphthalene dicarboxylic acid.

Diamines can be used alone or as salts of diacids.

The polyamines according to the invention may have primary or secondary functional group (tertiary amino groups are not considered as they are non reactive). Examples of suitable polyamines include bis hexamethylene triamine, an hexafunctional amine of formula

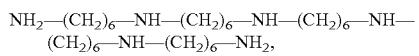

both deriving from the manufacture of hexamethylenediamine, POSS with amino terminal groups, ethylenediamine oligomers.

The polyacids (or their derivatives such as esters and anhydrides) according to the invention are typically selected from trimesic acid, pyromellitic acid, 2,2'-6,6'tetracarboxyethylcyclohexanone or POSS with carboxyl terminal groups.

The polyalcohols according to the invention are typically selected from pentaerythritol, trimethylol propane, dipentaerythritol, cyclodextrins, sugars, POSS with hydroxyl terminal groups.

Phosphorus containing molecules according to the invention are preferably: 2-carboxy ethyl phenyl phosphinic acid (CEPPA) for polyamides; a monoalcohol such as 2-(diphenylphosphinyl)-ethanol for polyesters; a monocarboxy derivative possessing phosphorus group such as 3-(diphenylphosphinyl)-propanoic acid both for polyamides and polyester.

The organic acids (or their derivative such as ester and anhydride), the amines and the alcohols with one or two functionalities according to the invention are typically selected from acetic, benzoic, adipic, suberic and sebacic acid, other long- or short-chain aliphatic mono/diacids, terephthalic acid, isophthalic acid, long- or short-chain aliphatic mono/diamines, aromatic mono/diamines, and long- or short-chain aliphatic mono/dialcohols.

The polymers according to the invention can have a molecular weight of between 1000 and 70,000 daltons; optimal flame-retardant properties can be obtained with at least 500 ppm of P deriving from the phosphorus functions in the polymer.

The polymers of the invention can be prepared by synthesis in glass or steel reactors or in an autoclave, under the following conditions.

Synthesis in Glass Reactors: Polyamides synthesis are conducted in 6 hours, in an oven at 270° C. under nitrogen flow and mechanical stirring or at a temperature higher than the polymer melting point.

Polyesters synthesis are conducted in three temperature steps with appropriate catalytic system; for example for PET synthesis the temperature steps are: 180° C. for 2 hours, 220° C. for 2 hours, 280° C. under vacuum for time necessary to obtain a good melt viscosity.

Synthesis are conducted in a glass apparatus, whose lower part (the flask) is inserted in the oven, while the upper part is maintained outside it. The upper part of the apparatus is fitted with three arms which allow:

a. Entry of nitrogen flow
b. Passage of stirring rod which provides mechanical stirring of the reaction mixture
c. Exit of nitrogen flow Synthesis in Steel Reactor: Polyamides synthesis are conducted in 6 hours, in an oven at 270° C. or at a temperature higher than the polymer melting point, under nitrogen flow, with or without mechanical stirring.

It is conducted in a steel reactor fastened with bolts in both the upper and lower parts; the reactor is placed in the oven, and only the top of it emerges; it is also provided with two arms for the entry and exit of nitrogen flows.

Synthesis in Autoclave: As an example the synthesis of nylon 6 is conducted in two phases, both at 280° C. and under mechanical stirring: the first (2 h) under pressure (lactam ring opening), and the second (4 h) under nitrogen flow (growth of molecular chain through polycondensation). The polymer is extracted from the reactor in the form of cables which are wound on a reel.

Whether the star or tree architecture is obtained depends on suitable stoichiometry, as known and described in the review by Voit and Lederer, cited above. Also, a mathematical model, in the case of polymers obtained from type AB monomers polymerized in the presence of comonomers giving a star architecture, allows the composition of the final polymer to be estimated, requiring only feed and conversion reached as input data [C. M. Yuan et al. Macromol. Chem. Phys. 202(10), 2086 (2001)].

In particular, the present invention allows the preparation of polyamides or polyesters with a complex architecture and containing phosphorus atoms, bonded to the polymer chain ends, which can be used as masters or directly as basic materials, and can be obtained in the ordinary manufacturing plants used for the various standard materials. The molecular weight, the macromolecular architecture and consequently the viscosity in the molten polymer can easily be modulated to facilitate its miscibility in the polymer matrix (such as Nylon 6, Nylon 66, etc.) in the case it is used as a master, and ensure even distribution of the flame-retardant functions throughout the material.

The invention also enables the number of flame-retardant functions to be programmed, and nanostructured organic/inorganic components to be inserted. The material can also be added as master to the matrix by compounding, and the contact time between the active functions of the master and the reactive groups of the matrix does not lead to crosslinking. The product can also act as carrier of other additives introduced into the polymer matrix. In view of its nature, it is perfectly compatible with polyamides, if it has a polyamide base, or polyesters, if it has a polyester base, and does not present phase segregation. Another advantage is the small amount of phosphorus in the final material (up to 5% by weight), which is not present as free red phosphorus. These characteristics pave the way for obtaining flame-retardant polyamide or polyester fibres, which is currently impossible in the case of polyamides.

The invention will be described in greater detail in the following examples, which relate to materials with a polyamide base with a type AB monomer, but can also be extended to the other classes of polymers cited in this invention.

EXAMPLE 1

| | |
|---|---|
| Caprolactam | 85% mol/mol |
| Aminocaproic acid: | 8.15% mol/mol |
| Bis(hexamethylene)triamine (HBHT): | 0.95% mol/mol |
| CEPPA: | 5.9% mol/mol |

The reagents are introduced simultaneously into the feed.
A polymer with 460 meq/Kg of CEPPA is obtained.

A polymer was also prepared using the same monomer ratios, but without CEPPA, to determine its molecular parameters with a mathematical model according to the conversion.

EXAMPLE 2

| Caprolactam | 89.2% mol/mol |
| --- | --- |
| Aminocaproic acid: | 8.55% mol/mol |
| Bis(hexamethylene)triamine (HBHT): | 0.31% mol/mol |
| CEPPA: | 1.94% mol/mol |

The reagents are introduced simultaneously into the feed.
A polymer with 160 meq/Kg of CEPPA is obtained.

EXAMPLE 3

| Dimethylterephthalate (terephthalic acid derivative) | 48.5% mol/mol |
| --- | --- |
| Ethylene Glycol plus an excess of 50% with respect to the stoichiometric ethylene glycol | 45.0% mol/mol |
| Pentaerythritol | 0.5% mol/mol |
| 2-(diphenylphosphoryl)ethanol | 6.0% mol/mol |

EXAMPLE 4

Three examples of polyamide 6 which confirm the architecture of the polymer obtained in the presence of a multifunctional amine co-monomer. To obtain a significant comparison, it should be noted that for an unregulated polyamide 6 with good mechanical properties, the value of the end amine groups is much lower (<70) and the number of end carboxyl group is equivalent to that of the terminal amines:

Titration of the terminal groups and molecular masses (Mn, expressed in linear nylon 6 equivalents) and molecular mass dispersion index (D) obtained by Size Exclusion Chromatography (SEC) are reported in the table.

| Sample | Mn | D | Terminal NH$_2$ | Terminal COOH |
| --- | --- | --- | --- | --- |
| 1 | 4177 | 1.53 | 514 | 54 |
| 2 | 5350 | 1.83 | 313 | 48 |
| 3 | 8832 | 1.68 | 191 | 31 |

Sample 1 is the sample with the highest multifunctional comonomer concentration; sample 2 has an intermediate concentration, and sample 3 has the lowest concentration. SEC data are expressed as PA6 linear equivalents; the polymers possess a dispersity value (D) of the molecular masses lower than 2, which confirms the star architecture (D=2 is the typical value of linear chains for polymers obtained by polycondensation).

Titrations show the very high number of amino end groups compared with the acid groups. This datum also confirms the branched structure of the polymer.

After reaction with a molecule possessing both —COOH and —POOH acid terminal groups, the following data are obtained:

| Sample | Mn | D | Terminal NH$_2$ | Terminal COOH | Terminal POOH |
| --- | --- | --- | --- | --- | --- |
| 1 | 2610 | 1.65 | 138 | 132 | 315 |
| 2 | 3501 | 1.76 | 93 | 91 | 176 |
| 3 | 4185 | 1.89 | 72 | 66 | 133 |

The quantities of multifunctional amine comonomer in samples 1, 2 and 3 are shown in the table above. In the case of the sample having the highest number of amino end groups (sample 1) the diacid containing phosphorus reacts only with its own carboxyl group, leaving free the terminal phosphinic group. The modification of the chain terminal changes the hydrodynamic behaviour of the polymer (different Mn values, lower than those measured as linear Nylon 6 in the preceding table); the narrow distribution confirms that the macromolecular architecture of the chain was maintained, and was therefore not modified during the reaction with the diacid phosphorus containing.

FIG. 1 shows the cone calorimeter analysis of the samples with diacid phosphorus containing: Master 460 (3) is sample 1 in the preceding tables (Example 1), Master 260 (2) is sample 2, and Master 160 (1) is sample 3 (Example 2).

In a standard PA6 the RHR (Rate of Heat Release) is approx. 2040 KJ/sm$^2$, whereas in the three samples considered it is a maximum of 700 KJ/sm$^2$, indicating that the rate of heat release is approx. one-third of that of an unstabilised polyamide.

Figure 2:
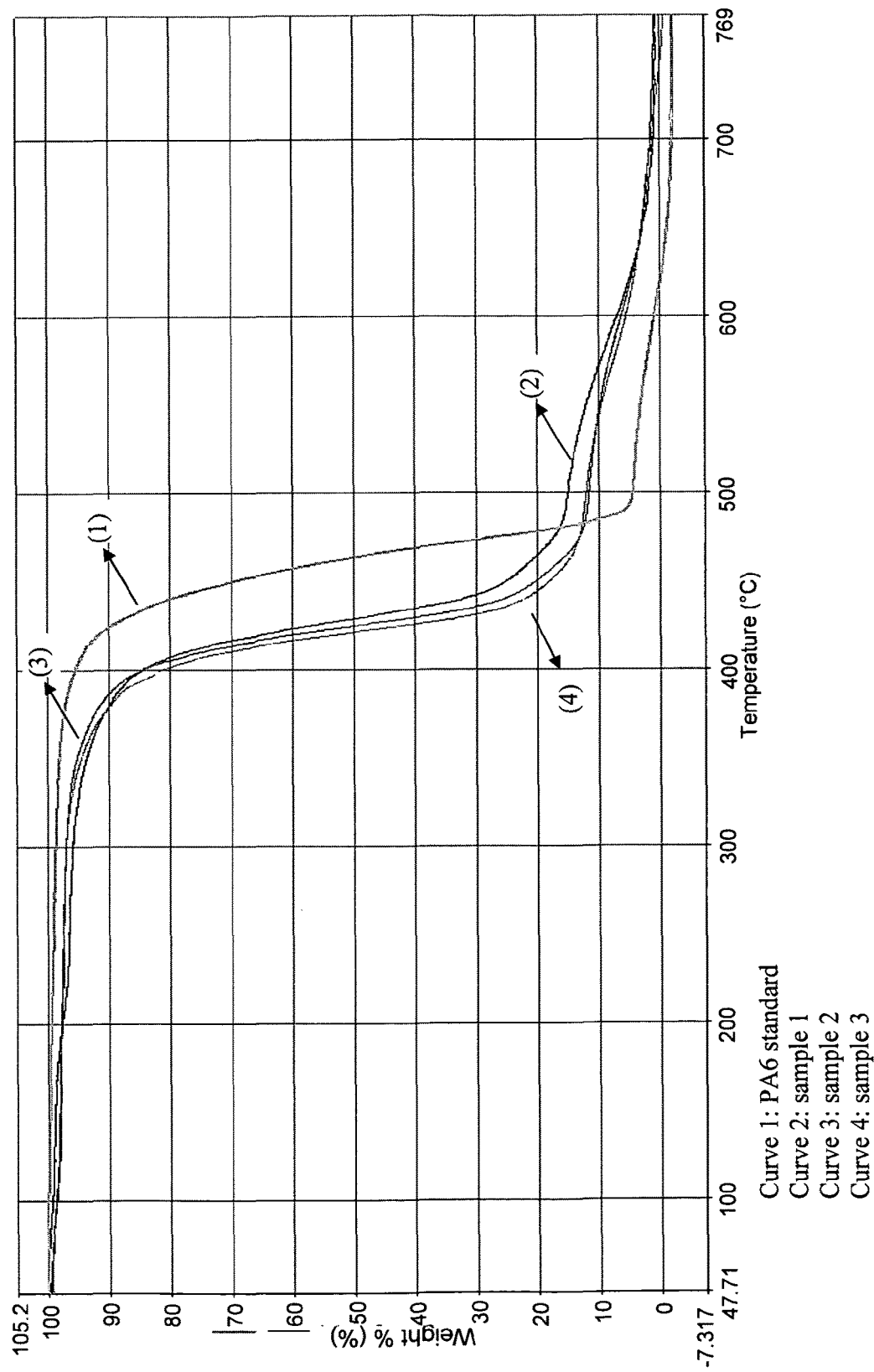
FIG. 2 shows thermal stability data with TGA (Thermo-Gravimetric Analysis).

Thermal stability data with TGA (ThermoGravimetric Analysis), shown in FIG. 2, demonstrate that samples start to degrade earlier than a normal PA6 (i.e. at lower, less dangerous temperatures) and take longer to break down completely. The data, combined with the RHR data, indicate in general a less "violent", less dangerous breakdown of the material, and consequently greater safety of use. Moreover, the higher residue at high temperatures indicates the formation of a larger amount of carbon residues (char), which hinder combustion.

EXAMPLE 5

Use of Mathematical Model

The mathematical model used estimates the composition of the final polymer using as input data the feed and the conversion obtained; the model provides the percentage of the species formed, indicating their molecular weight and macromolecular architecture.

For example, it gives the results for the number-average molecular weight (Mn) and weight-average molecular weight (Mw), molecular weight distribution (D), percentage of species with linear chain (% lin.) and star-branched chain (% star) of a polymer obtained by maintaining a constant feed and varying the conversion attained during the reaction:

Feed: Caprolactam; HBHT (0,009 M-460 meq/Kg)—feed similar to EXAMPLE 1, without CEPPA.

| Mn | Mw | D | % lin | % star |
| --- | --- | --- | --- | --- |
| Conversion = 93.2% | | | | |
| 4242 | 8949 | 2.11 | 25.96 | 74.04 |
| Conversion = 94.0% | | | | |
| 6341 | 11274 | 1.778 | 14.80 | 85.20 |

-continued

| Mn | Mw | D | % lin | % star |
|---|---|---|---|---|
| Conversion = 94.6% | | | | |
| 9954 | 13677 | 1.374 | 4.40 | 95.60 |

EXAMPLE 6

Analysis of Materials

Figure 3:
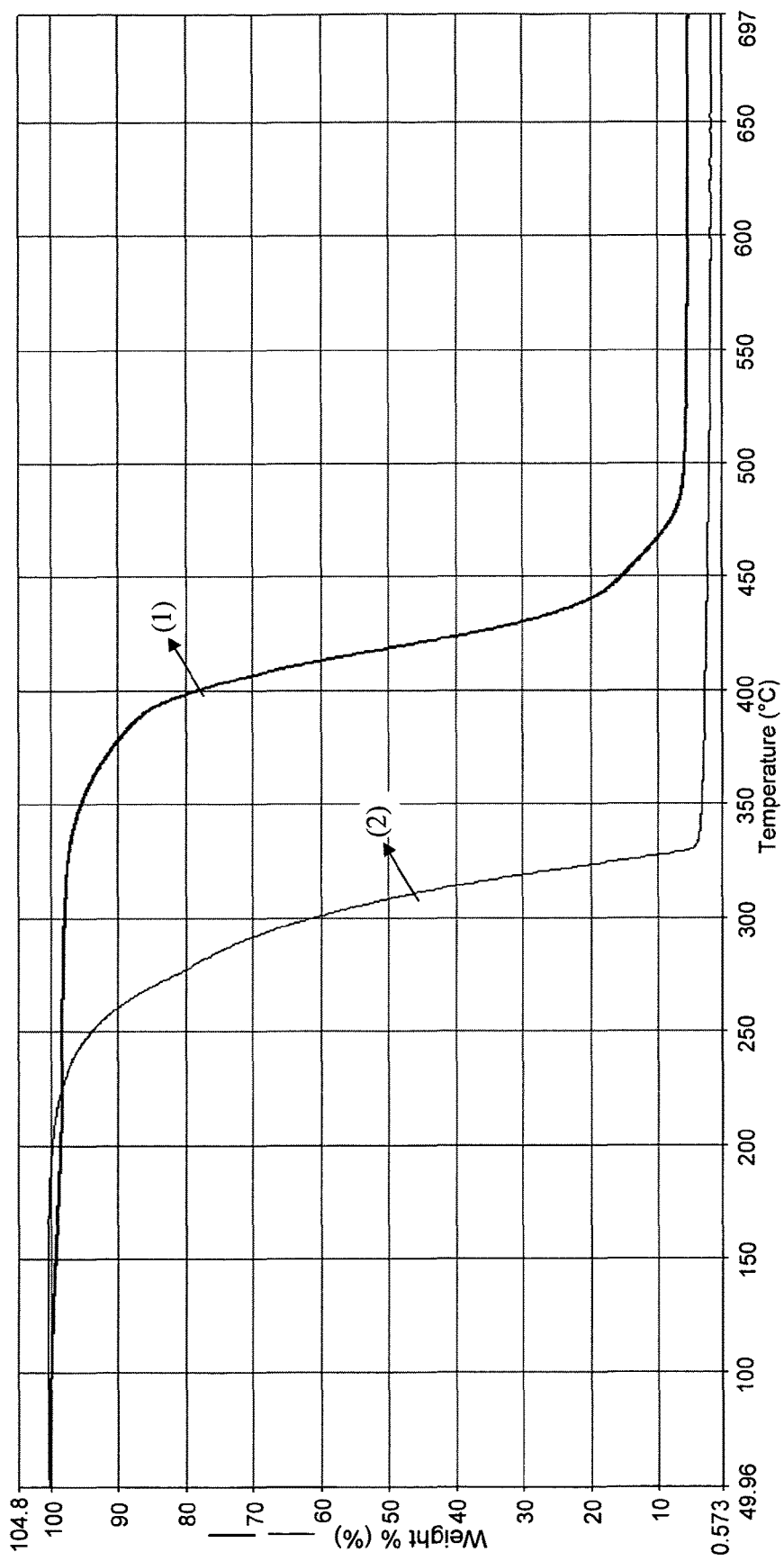
FIG. 3 shows a TGA of PA6 with HBHT+CEPP 460 (curve 1) and pure CEPP (curve 2).

TGA of PA6 with HBHT+CEPP 460 (curve 1) & pure CEPP (curve 2); shows that CEPP has reacted with the polymer, because the breakdown starts at T much higher than that of the pure compound (FIG. 3).

Figure 4:
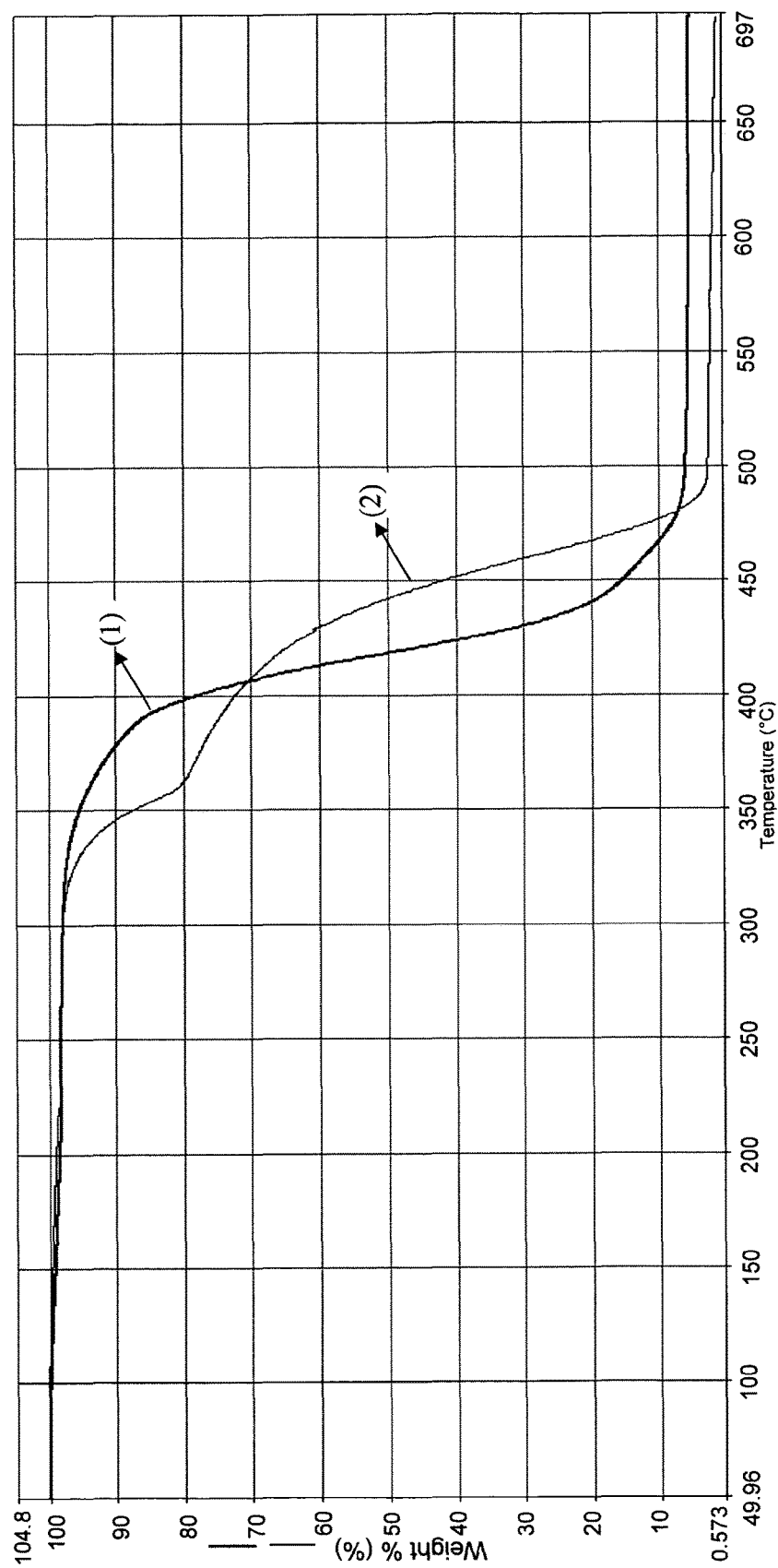
FIG. 4 a TGA of PA6 with HBHT+CEPP 460, 255, 160 vs PAS standard.

TGA of PA6 with HBHT+CEPP 460 (curve 1) & PA6+ 20% melamine cyanurate (curve 2): the second PA6 is a physical mixture commonly used for industrial applications. There is a 20% weight loss, corresponding to melamine loss, between 300° C. and 370° C. (FIG. 4).

Figure 5:
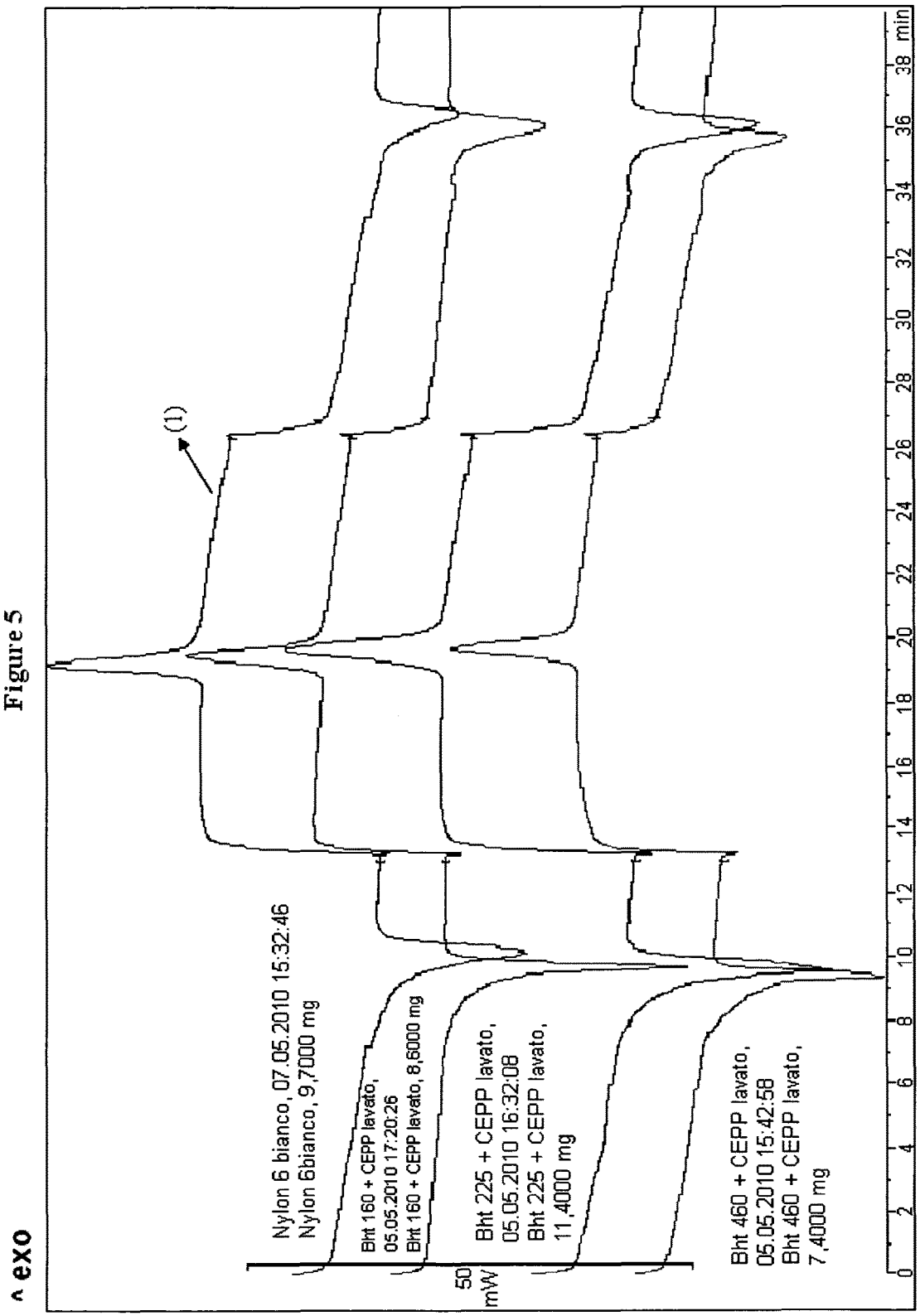
FIG. 5 shows a DCS of PA6 with HBHT+CEPP 460, 255, 160 vs PA6 standard.

DSC of PA6 with HBHT+CEPP 460, 255, 160 vs PA6 std: curve 1 is pure crystalline PA6. The melting points (downward peaks) are a few degrees lower than those of pure PA6. Crystallizations (curves with upward peaks) have minimal variations (FIG. 5).

The invention claimed is:

1. Branched polymers polyamides or polyesters having a star- or tree-shaped structure obtainable by polymerisation of a bifunctional monomer of type AB and/or of monomers of type AA+BB in the presence of:
   A) one or more polyamines and/or polyacids and/or polyalcohols and/or Polyhedral Oligosilsequioxanes compounds (POSS) having at least three functional groups selected from primary and/or secondary amino functions and/or carboxylic acids or derivatives thereof and/or hydroxyl functions;
   B) one or more phosphorus containing molecules reacting with only one reactive group during the polymerization; wherein said phosphorous containing molecules are 2-carboxy ethyl phenyl phosphinic acid (CEPPA) in polyamides, 2-(diphenylphosphinyl)-ethanol in polyesters or 3-(diphenylphosphinyl)-propanoic acid in polyamides or polyesters;
   C) optionally, one or more carboxylic acids (or their derivatives such as ester and anhydride) and/or amines and/or alcohols having one or two functional groups, with the proviso that B) is in excess of A).

2. Polymers as claimed in claim 1, wherein monomer AB and monomers of type AA+BB have A=—COOH (or his derivative such as ester and anhydride) and B=—NH$_2$ or —OH.

3. Polyamides as claimed in claim 1, wherein monomers AB are selected from caprolactam, 6-amino-hexanoic acid, para or meta amino benzoic acid, 11-aminoundecanoic acid, lauryl lactam, 12-aminododecanoic acid, and wherein monomers of type AA+BB are selected from: as AA monomer, adipic acid, suberic acid, sebacic acid, terephthalic/ isophthalic acid, cyclohexane dicarboxylic acid or esters thereof; as BB monomer, hexamethylendiamine, 1,4 butylenediamine, isophorondiamine, phenylendiamines.

4. Polyamides as claimed in claim 3, wherein monomers AB or AA+BB are selected from: as AB monomers, caprolactam, 6-amino-hexanoic acid; as AA monomer, adipic acid and as BB monomer, hexamethylenediamine and 1,4-butylenediamine.

5. Polyamides as claimed in claim 1, wherein the polyamines are selected from bis hexamethylenetriamine, a hexafunctional amine of formula NH$_2$—(CH$_2$)$_6$—NH—(CH$_2$)$_6$—NH—(CH$_2$)$_6$—NH—(CH$_2$)$_6$—NH—(CH$_2$)$_6$—NH$_2$, polyamines deriving from the production of hexamethylenediamine, POSS with amino terminal groups, ethylenediamine oligomers; the polyacids or their esters and anhydrides are selected from trimesic acid, pyromellitic acid,2,2'-6,6'-tetracarboxyethylcyclohexanone, POSS with carboxyl terminal groups.

6. Polyamides or polyesters according to claim 1, wherein the organic acid, the mono- or difunctional amine or alcohol are selected from acetic acid, benzoic acid, adipic acid, suberic acid, sebacic acid, long- or short-chain aliphatic mono/diacids, terephthalic acid, isophthalic acid, long- or short-chain aliphatic mono/diamines, aromatic mono/diamines, long- or short-chain aliphatic mono/dialcohols.

7. Polyamides or polyesters according to claim 1, having a molecular weight ranging between 1000 and 70,000 Daltons.

8. Polyamides or polyesters according to claim 1, having a phosphorus content of at least 500 ppm.

* * * * *